United States Patent [19]

Beach et al.

[11] Patent Number: 4,930,870
[45] Date of Patent: Jun. 5, 1990

[54] RETRO-REFLECTORS

[75] Inventors: Allan D. Beach; John S. Brunton, both of Auckland, New Zealand

[73] Assignee: ItW New Zealand Limited, Auckland, New Zealand

[21] Appl. No.: 221,465

[22] Filed: Jul. 19, 1988

[30] Foreign Application Priority Data

Jul. 27, 1987 [NZ] New Zealand ............. 220831
Jul. 27, 1987 [NZ] New Zealand ............. 221211
Jul. 27, 1987 [NZ] New Zealand ............. 221212

[51] Int. Cl.$^5$ ............................................. G02B 5/12
[52] U.S. Cl. ........................................ 350/97; 350/103; 350/104; 350/106
[58] Field of Search ............... 350/97, 102, 103, 106, 350/100, 167, 442, 444, 446, 504, 104; 404/11, 14

[56] References Cited

U.S. PATENT DOCUMENTS

| | | | |
|---|---|---|---|
| 1,903,385 | 5/1938 | Schiller | 350/104 |
| 2,067,701 | 1/1937 | James | 350/106 |
| 2,096,166 | 10/1937 | Eshbaugh | 350/106 |
| 2,334,765 | 11/1943 | Hermann | 350/106 |
| 2,374,003 | 4/1945 | Eckel | 350/106 |
| 3,334,345 | 8/1967 | Bradford | 350/104 |
| 3,551,024 | 12/1970 | Priest, Jr. | 350/106 |
| 3,817,596 | 6/1974 | Tanaka | 350/103 |
| 3,851,947 | 12/1974 | Montgomery | 350/103 |
| 3,963,309 | 6/1976 | Schwab | 350/104 |
| 4,245,889 | 1/1981 | Hoffman | 350/102 |
| 4,560,236 | 12/1985 | Clarke | 350/102 |
| 4,660,929 | 4/1987 | Sick | 350/446 |

FOREIGN PATENT DOCUMENTS

| | | |
|---|---|---|
| 0250165 | 12/1987 | European Pat. Off. |
| 372070 | 5/1932 | United Kingdom |
| 804929 | 11/1958 | United Kingdom |
| 929959 | 6/1963 | United Kingdom |
| 1138624 | 1/1969 | United Kingdom |
| 1258302 | 12/1971 | United Kingdom |
| 1512152 | 5/1978 | United Kingdom |

Primary Examiner—Bruce Y. Arnold
Assistant Examiner—Loha Ben
Attorney, Agent, or Firm—Young & Thompson

[57] ABSTRACT

A retro-reflector system 20 suitable for a highway lane marker is moulded in one piece from a transparent plastic material and has a plurality of side by side curved "roof edge" reflectors 21 (only one of which is illustrated) and a part elliptical lens 26 extending across the front "V" of each of the "roof edge" reflectors 21. A light ray on path 23 will pass through lens 26, be reflected by surfaces 22, 24, and will leave the lens 26 along a path 28 which is inclined slightly upwardly with respect to path 23 so that light from a vehicle's headlights will be directed upwardly towards the driver's head.

20 Claims, 6 Drawing Sheets

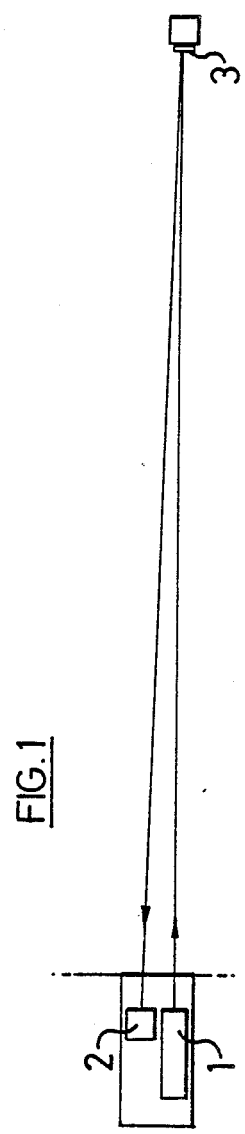
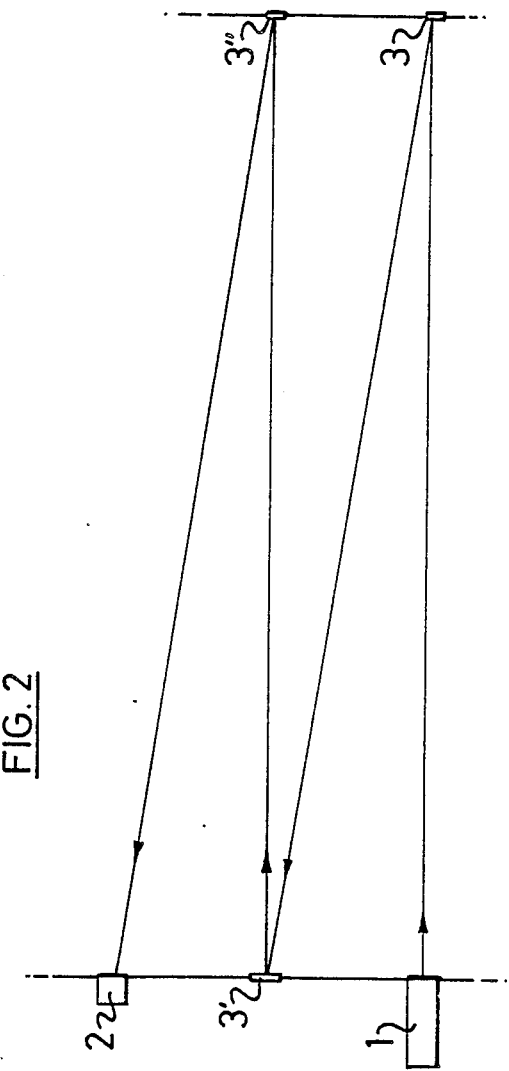
FIG.1
FIG.2

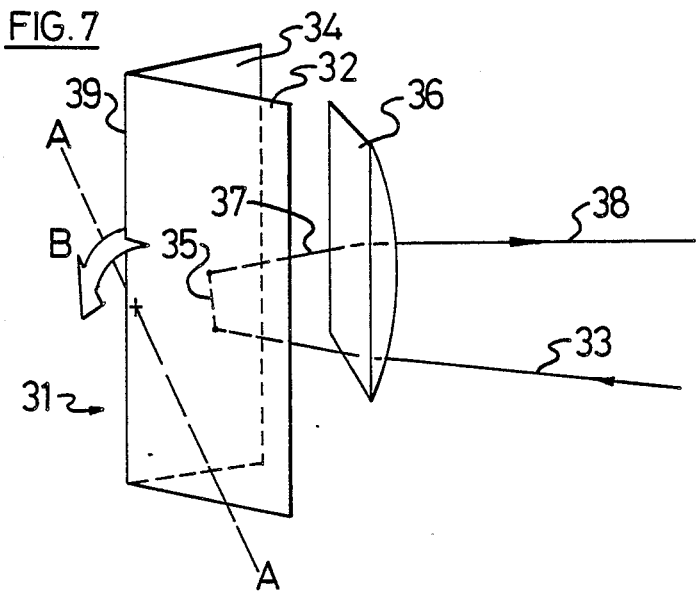

RETRO-REFLECTORS

FIELD OF THE INVENTION

This invention relates to reflector systems (including those systems in which reflectors and lenses are combined) and has particular application to retro-reflectors. It has been devised primarily, though not necessarily solely, for providing highway lane markers.

BACKGROUND OF THE INVENTION

Existing retro-reflectors are generally produced as moulded glass "cats eye" reflectors (a combination of a concave mirror and a convex lens) or from moulded (generally plastic) cube-corner reflectors.

Examples of such retro-reflectors are shown in the following patents:
U.S. Pat. No. 4,358,217—Jones
U.S. Pat. No. 4,504,169—Jones
GB No. 1,530,630—Ferro Corporation
GB No. 2,075,094 A—Stone
GB No. 2,121,463 A—Egan et al.
GB No. 2,128,664 A—Takahashi et al.
GB No. 2,190,123 A—Horne
U.S. Pat. No. 3,409,344—Balint et al.

Moulding imperfections in the finished product and the time required in accurately tooling the sharp corners required for the "cube-corner" reflectors render them less than satisfactory as highway lane markers.

In addition, existing retro-reflectors used in highway lane markers are designed "in theory" to reflect an incident light ray directly back towards its source. In practice, manufacturing imperfections are such that the returned light is diffused (generally symmetrically) as a cone of light centered about the reflector-source axis, so that the driver of a vehicle will see only a small fraction of the light returned from a highway lane marker.

OBJECT OF THE INVENTION

It is an object of the invention to provide an improved reflector system or one which will at least provide the public with a useful choice.

BRIEF SUMMARY OF THE INVENTION

In one aspect the invention provides a retro-reflector system including a first reflective surface arranged to receive incident light from a source; a second reflective surface arranged to receive light reflected from said first reflective surface; and a first lens arranged in crossed configuration with at least said second reflective surface, so that in use said incident light passes through said first lens and is reflected from said first reflective surface to said second reflective surface, and is reflected from said second reflective surface so as to pass through said first lens, and is reflected generally back towards its source.

As will be explained with reference to the preferred embodiment, such a retro-reflector can be designed to return the light substantially symmetrically about the source, or more preferably can be designed to return the light at a substantially constant angle with respect to the source (so that, in the case of a highway lane marker, the returned light is centered on the driver's head rather than on the vehicle's headlights).

Such a reflector system preferably has an array of minute reflector pairs, each pair forming a "roof edge" at their line of intersection, and a single preferably part elliptical lens extending across the front of each array.

Preferably each "roof edge" is curved.

In a second aspect the present invention provides a retro-reflector system including reflecting means arranged to in normal use reflect light received from a source generally back towards the source but at a substantially constant angle of displacement from said source.

This can be achieved in a number of different ways, for example the invention includes within its scope:

(a) A retro-reflector system in which the reflecting means includes a plurality of reflective surfaces arranged at angles to each other such that, in normal use, light received on one of said surfaces from a source is reflected onto another of said surfaces before being reflected at a substantially constant angle of displacement from said source. (This is a modified "cube-corner" reflector).

(b) A retro-reflector system including a first reflective surface arranged to receive incident light from a source; a second reflective surface arranged to receive light reflected from said first reflective surface; and a first lens arranged in crossed configuration with at least said second reflective surface, so that in use said incident light passes through said first lens and is reflected from said first reflective surface to said second reflective surface, and is reflected from said second reflective surface so as to pass through said first lens to a region displaced from said source by a substantially predetermined amount in a substantially predetermined direction, and said light is diffused by said reflector/lens system to a substantially predetermined extent. (This is an "optically tilted" version of the retro-reflector system according to the first aspect of this invention).

(c) A retro-reflector system in which reflecting means includes a plurality of substantially cylindrical "cats eye" optical elements each having a reflecting surface at one end and a lens at the other end, the lens and reflecting surface being optically linked so as to return light from the reflecting means at a different angle to that of a light ray entering said lens of a said optical element.

In a further aspect the invention may broadly be said to consist in a highway marker including one or more retro-reflector systems substantially as hereinbefore set forth.

Preferably such a highway marker is adapted to return the reflected light at an angle of about 0.25° above the incoming light path, so that the light can be directed towards the driver's head rather than towards the vehicle's headlights.

The invention may also broadly be said to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

These and other aspects of the present invention will be made apparent in the following description of preferred embodiments of the invention, given by way of example only, with reference to the accompanying drawings, in which:

FIG. 1: shows a retro-reflector of this invention used with a security light beam to provide vertical displacement of a return beam;

FIG. 2: shows a number of retro-reflectors of this invention to provide horizontal displacement of the reflecting beam(s) to provide security over a large area;

FIG. 7: shows a third embodiment of the present invention in diagrammatic perspective view;

FIG. 10b: shows a cross-section on line XX of FIG. 10a;

DESCRIPTION OF THE PREFERRED EMBODIMENTS

The present invention provides a number of different means for reflecting light from a source at a substantially constant angle to that source.

In particular such a system could be applied to:

(a) use in road marking or reflectors for vehicles, by which it is desired to direct reflected light from vehicle headlights somewhat above those headlights, so as to be directed more specifically towards a driver of the vehicle, rather than back towards the headlights;

(b) guidance reflectors for unlit aircraft runways with reflectors of different colors deflecting the light up or down by slightly different angles to provide visual cues to the pilot from the retro-reflection of aircraft's headlights;

(c) security light beam systems.

FIG. 1 shows a doorway mounted security light beam system having a sender 1 and a receiver 2 in the same unit, one below the other. A retro-reflector 3 causes a beam of (typically infra-red) light traversing the doorway to be reflected back towards the receiver. This avoids the need to run wires over or under the doorway as with prior art security beam systems where the sender and receiver are on opposite sides of the doorway.

FIG. 2 shows a similar security light beam system where the sender 1 and receiver 2 are displaced horizontally but connected optically by the placement of retro-reflectors 3, 3', 3", which displace the return beam by say 15° (depending upon the area to be covered). A similar system could be used for the doorway of FIG. 1 (by turning the reflectors through 90°) so that substantially all of the doorway can be covered by the path of the reflected light beam.

Figure 3A:
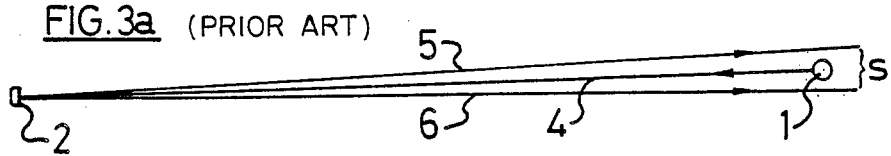
FIG. 3a: shows the pattern of reflected light from a conventional cube-corner retro-reflector.

FIG. 3a shows the return paths for light from a source 1 (typically a vehicle headlamp) which is reflected by a conventional cats eye or cube-corner reflector 2. The central path 4 shows the return beam is centered on the light source. Outer rays 5, 6 show the extent of vertical spread or diffusion of the beam as a result of manufacturing tolerances. The reflected light spreads above and below the source, with the result that the driver sees only some of the reflected light (between paths 4 and 5). (Horizontal spread of the beam is not shown).

Figure 3B:
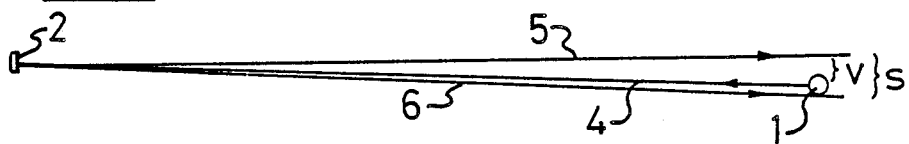
FIG. 3b: shows one pattern of reflected light from a retro-reflector of FIG. 5 of this invention.

FIG. 3B shows that for the same vertical spread 'S' the reflected light can be centered above (or below) the light source, so that most of the reflected light can be directed towards the driver's head rather than towards the vehicle headlights. A small proportion is shown below the source.

For most cars and light trucks a vertical displacement of 0.25° is sufficient to direct the reflected beam at the driver's eyes. At 100 meters distance, a 0.25° retro-reflector will give a vertical displacement 'V' between the source beam and return beam of 400 mm, and at 200 meters distance, 'V' will be 870 mm. The majority of car drivers eyes are 400–500 mm above the center line of a car's headlights. In taller vehicles such as a Toyota Land Cruiser this distance is 870 mm.

Figure 3C:
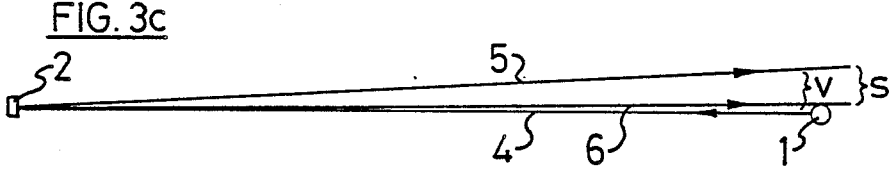
FIG. 3c: shows another pattern of reflected light available from the retro-reflector of FIG. 6 of this invention.
Figure 4:
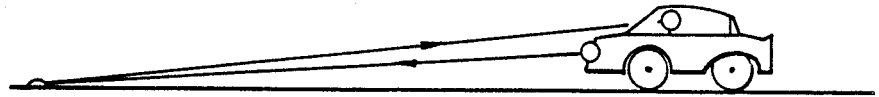
FIG. 4: shows a retro-reflector of this invention used as a highway lane marker designed to deflect the return beam upwardly towards the driver's head.

FIG. 3c shows the reflected beam can be centered above the light source. It can also be centered to the left or the right of the light source. This will be described with particular reference to the reflector system of FIG. 6.

FIRST EMBODIMENT

Figure 5:
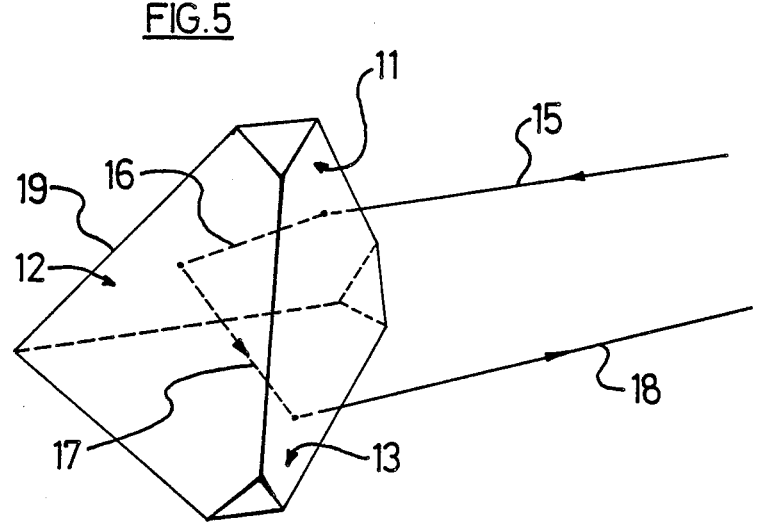
FIG. 5: shows a first embodiment of the present invention in a perspective view of a modified cube-corner reflector.

Referring to FIG. 5, a modified cube-corner reflector system is provided including retro-reflecting means desirably comprising first, second and third planar reflective surfaces (11, 12, 13 respectively) arranged so as to receive light in use from a source along beam 15 and return light along beam 18 to a position substantially displaced from that source (not shown).

The first, second and third reflective surfaces, 11, 12, 13, may preferably be arranged so that light incident upon any one of reflective surfaces 11, 12, 13 from a source is reflected by each of the reflective surfaces in turn. Suitably, first (11) and second (12) reflective surfaces are mutually orthogonal, and third reflective surface 13 is arranged so as to form angles of substantially less than or substantially more than 90° with respect to each of first and second reflective surfaces 11, 12. Desirably first, second and third reflective surfaces, 11, 12, 13, are arranged so that light incident upon any one of reflective surfaces 11, 12, 13 from an external source is reflected by each of the reflective surfaces 11, 12, 13 in turn.

The reflective surfaces 11, 12, 13 are desirably arranged so that, in use, light incident upon either of first or second surfaces 11, 12 from an external source is reflected so as to be received by the other of surfaces 11 or 12 and is thence reflected so as to be received by third reflective surface 13, and reflected in turn therefrom, and is thus returned by the reflector system to a position displaced from the external source of light by a substantially predetermined extent and in a substantially predetermined direction.

In the case of a pavement retro-reflector containing a plurality of cube-corner reflectors, the arrangement of each of the modified cube-corners is such that the displacement of the return beam is substantially vertical so that more of the returned light is displaced upwards with respect to the source than is displaced downwards with respect to the source, as shown in FIG. 3B.

For example, referring to FIG. 5, a first incident light beam 15 from a source (not shown) is received by first reflective surface 11 and reflected as second beam 16 so as to be received by second reflective surface 12 and thence further reflected as third light beam 17 which is received by third reflective surface 13, which is suitably tilted about a horizontal axis so as to form angles with respect to each of first and second reflective surfaces 11, 12 of for example significantly less than 90°, and thus reflects the received light beam 17 as returned light beam 18, which is not parallel with incident light beam 15, and is thus directed to a position substantially displaced, preferably vertically, from the source (not shown) of incident light beam 15.

Desirably, in the preferred form in use as a highway lane marker, the reflecting means are arranged so that more of the total returned light which has been reflected by the reflector system is directed upwards with respect to the source of incident light than is directed downwards with respect to the source of incident light. In the preferred form illustrated, this is achieved by orienting one edge, such as the edge 19 of second reflective surface 12, so as to be in a vertical plane, and tilting the opposing reflective surface, being third reflective surface 13, about a horizontal axis so as to form an angle substantially smaller than 90° with each of first and second reflective surfaces 11, 12.

In use as part of the highway lane marker, a suitable angle may be 89.75° (to give the 0.25° displacement previously discussed) but the angle may of course be varied depending on the degree of displacement required in the particular situation. Obviously, light initially incident from an external source on third reflective surface 13 will be returned to a position displaced downwards, from the incident source by the same extent and in the same direction as the upwards displacement experienced by light originally incident on either of reflective surfaces 11, 12. However, it can be seen that substantially two thirds of the light returned by the reflector system as a whole will be displaced upwards, whereas only one third (being light originally incident on third reflective surface 13) will be displaced downwards.

SECOND EMBODIMENT

Figure 6:
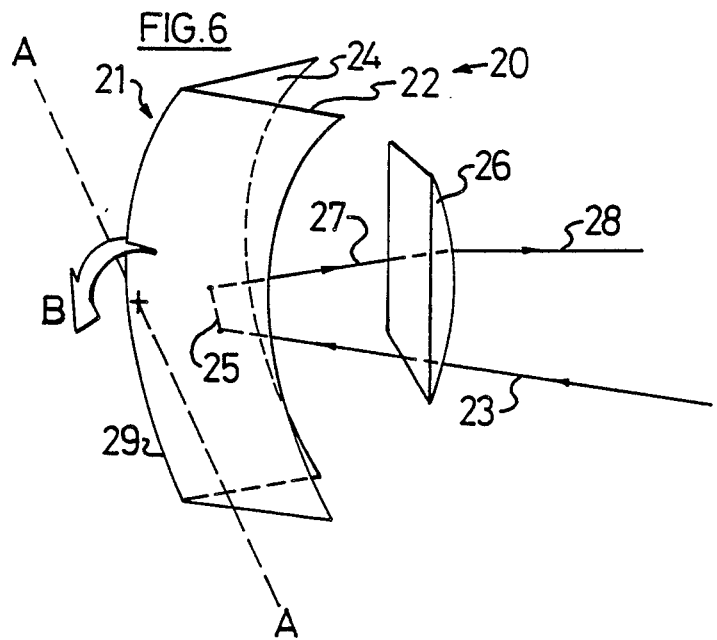
FIG. 6: shows a second embodiment of the present invention in diagrammatic perspective view.
Figure 8B:
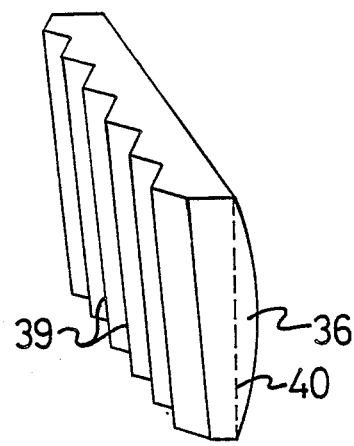
FIG. 8b: shows a perspective view of a one piece moulding containing a series of arrays of the optical elements of the second embodiment.
Figure 8A:
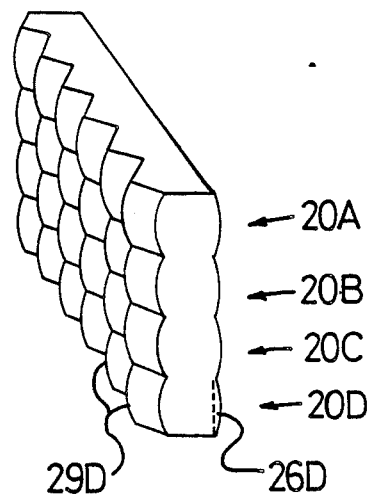
FIG. 8a: shows a perspective view of a one piece moulding containing an array of the optical elements of the third embodiment.

Referring to FIGS. 6 and 8a, an alternative retro-reflector system 20 is preferably formed in one piece and has two optical components (21, 26) which are illustrated separately in order to explain the operation of this system. A reflector system 21 is provided comprising a first curved reflective surface 22 arranged to receive incident light 23 from a source (not shown), a second curved reflective surface 24 arranged to receive light 25 reflected from first reflective surface 22. In addition a lens 26 is arranged in crossed configuration with at least second reflective surface 24, so as to receive reflected light 27 from second reflective surface 24. The component parts 21, 26 or more preferably the integral unit 20 can be transparent, or a colored transparent material. For example, transparent reflectors, amber reflectors, and red reflectors can readily be made from a plastic material such as acrylic (polymethyl-methacrylate) or polycarbonate.

Reflective surfaces 22, 24 are preferably arranged substantially at right angles to each other, and first lens 26 is preferably a part elliptical lens element, or alternatively may preferably be a part cylindrical lens element.

Reflective surfaces 22, 24 are desirably arranged in use so as to substantially constrain the horizontal spread of reflected light 27, and also so as to retain retro-reflectivity over substantially the whole horizontal range of angles of incidence of light thereon.

First lens 26 may be arranged in crossed configuration with both reflective surfaces 22, 24 so that both incident light 23 and reflected light 27 are received by the first lens 26. Alternatively, only the reflected light 27 may pass through two or more equivalent lenses, which may be adapted to cancel out one another's respective optical distortion effects.

In use, incident light 23 is reflected from first reflective surface 22 to second reflective surface 24 and reflected light 27 is directed by retro-reflector system 20 generally back towards the source of incident light 23. Such a system allows the returned light to be centered on the source (0° displacement), or the light can be returned at a chosen displacement angle.

Preferably, reflective surfaces 22, 24 are arranged in use so that the line of intersection 29 (or "roof edge") is substantially upright, and is also substantially concave with respect to the incident light. The radius of this arcuate line 29 is related to the optical properties of the front lens. In practice, it is generally convenient to make the radius of this arcuate "roof edge" 29 and the focal length of the front lens equivalent to the total thickness of the optical element 20.

Reflective surfaces 22, 24 may desirably be arranged in use so that reflected light 27, 28 is directed to a region substantially above the source of incident light 23. This upward direction can be achieved by optically tilting reflective surfaces 22, 24 slightly upwards, for example by rotation about (horizontal) axis A—A in the direction of arrow B. The reflective surfaces thus tilted, act as plane mirrors in the elevation direction. In practice, this can be achieved by moving the center of curvature of the roof edge 29 with respect to the center of curvature of the front lens 26.

Reflected light 28 is diffused by reflector/lens system 20, specifically by lens 26, to a substantially predetermined extent. Lens 26 may be adapted to diffuse reflected light 27 so as to give a vertical spread in the range of from about 0.25° to about 0.5°, in the reflected light 28. Lens 26 is desirably arranged horizontally in use, and may extend across the front of a plurality of reflectors.

In use reflective system 20 may be incorporated into a highway lane marker. Such markers are generally composed of precise plastic moldings with integral or fitted reflective and/or lens elements. We have found that it is possible to mould the front lens and a plurality of the reflective systems 21 as an integral unit.

Large elements, e.g. reflective signs could be embossed on the opposing faces of transparent sheet material such as plastic or glass material.

Metallizing of the back face of the reflector system 21 enhances performance but is not always essential as the roof edge in theory provides total internal reflection, at least at angles not far removed from the axis of the reflector system.

In use as a highway marker the elements of the reflector/lens system of the invention are arranged to reflect headlight beams back towards the vehicle bearing the headlights but specifically aimed above the headlights so as to be optimally visible to the observer i.e. the vehicle driver. The reflective surfaces can be designed so as to provide a precise horizontal spread of the reflected light and retain substantial retro-reflectivity over a wide range of angles of light incidence, (adequate to provide good visibility on bends). This can be achieved by varying the angle between the curved reflective surfaces 22, 24, or by tilting the curved reflective surfaces 22, 24, to the left or right as required.

The angle of aim of the light above the head lights is achieved by tilting the reflective surfaces 22, 24 slightly upwards. Desirably, the lens 26 and reflective surfaces 22 and 24 are constructed and arranged so that the center of curvature of the concave line of intersection 29 is close to but slightly vertically higher than that of the preferably elliptical lens 26.

Lens 26, preferably an elliptical, a cylindrical, or alternatively a circular lens element, can be designed so as to provide a small vertical spread of the reflected light, preferably from 0.5° to 1°, so as to cater for the differing separation and absolute heights relative to the road surface of headlights and observer (the vehicle driver). The precise degree of diffusion can be specified to cater for varying vehicle dimensions, and for varying road gradients and configurations, as well as the optimum viewing distance from a vehicle to the reflector.

Of course, in use a plurality of tiny reflector/lens systems according to the invention would be arranged to form a series of arrays 20A, 20B, 20C, 20D (etc.) as shown in FIG. 8a. The arrays of FIG. 8a show a retro-reflector designed to return light with zero vertical displacement, i.e. the center of the roof edge 29D is optically aligned with the center of curvature of the lens 26D.

THIRD EMBODIMENT

Referring to FIGS. 7 and 8b, a further reflector/lens system 31 is provided comprising a first planar reflective surface 32 arranged to receive incident light 33 from a source (not shown), a second planar reflective surface 34 arranged to receive light 35 reflected from first reflective surface 32, and a first lens 36 arranged in crossed configuration with at least second reflective surface 34, so as to receive reflected light 37 from second reflective surface 34.

Reflective surfaces 32, 34 are preferably arranged substantially at right angles to each other, and first lens 36 is preferably a cylindrical lens element, or alternatively may preferably be a circular lens element.

First lens 36 may be arranged in crossed configuration with both reflective surfaces 32, 34 so that both incident light 33 and reflected light 37 are received by the first lens 36.

Alternatively, only the reflected light 37 may pass through first lens 36, or the complete light path may pass through two or more lenses, which may be adapted to cancel out one another's respective optical distortion effects.

In use reflective system 31 may be incorporated into a highway lane marker in a similar fashion to that of the FIG. 6 embodiment.

In use as a highway marker the elements of the reflector/lens system of the invention are arranged to reflect highlight beams back towards the vehicle bearing the headlights but specifically aimed above the headlights so as to be optimally visible to the observer i.e. the vehicle driver. The reflective surfaces can be designed so as to provide a precise horizontal spread of the reflected light (adequate to provide good visibility on bends) while the angle of aim of the light above the head lights is achieved by tilting the reflective surfaces 32, 34 slightly upwards.

In use a plurality of reflector/lens systems according to the invention could be arranged to form an array as shown in FIG. 8B. A single part elliptical lens 36 extends across the front of the array with its main axis at substantially right angles to the lines of the roof edges 39, each of which roof edges 39 tilt back slightly with respect to the vertical interface 40 (at the rear of the lens 36), to return the light at a slight upward angle. The unit can be moulded from transparent plastic as a single element of the desired size; or a plurality of such elements can be combined in one moulding (in a similar fashion to that shown in FIG. 8A).

FOURTH EMBODIMENT

Figure 9:
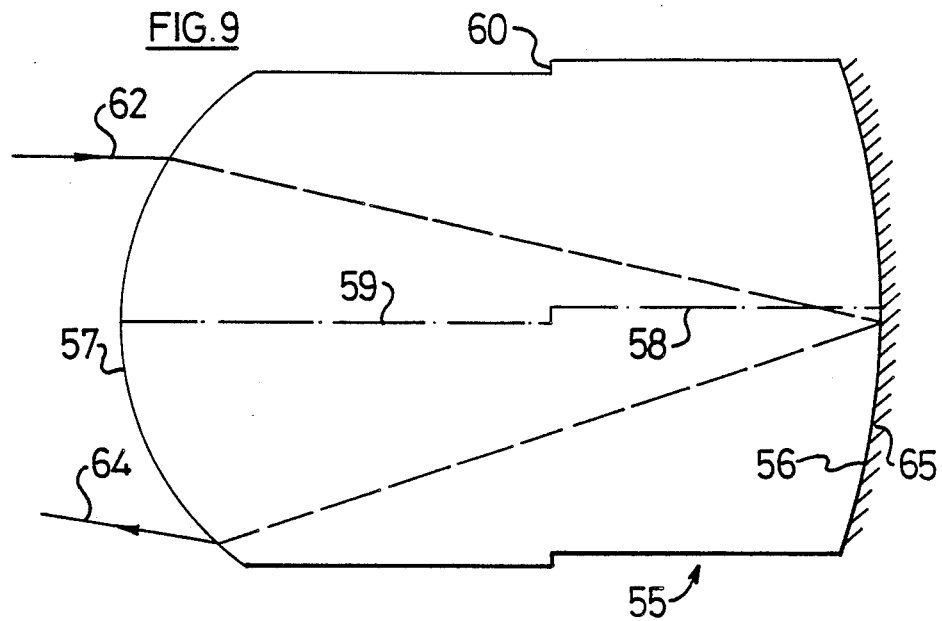
FIG. 9: shows a fourth embodiment of the present invention in axial cross-section through a modified cats eye reflector.
Figure 10A:
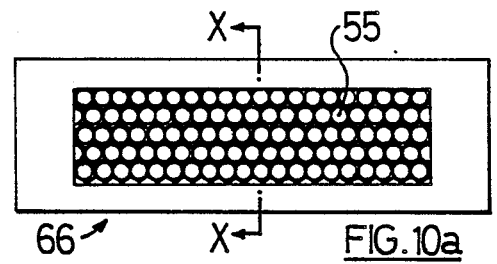
FIG. 10a: shows a front elevation of a moulded plastic reflector containing a plurality of "cats eyes" of the type shown in FIG. 9.
Figure 10B:
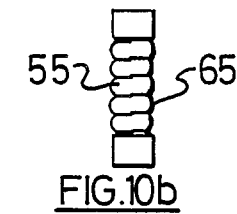
Figure 11:
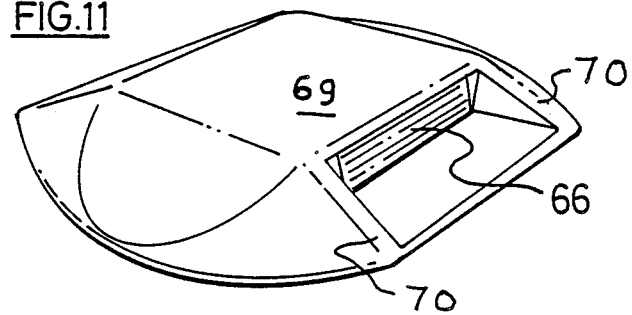
FIG. 11: shows the placement of the reflector of FIG. 10a within a moulded pavement marker.

FIGS. 9, 10 and 11 show a "cats eye" type of reflector moulded from a transparent material such as acrylic, or other mouldable transparent plastic material. It will be possible to mould these of glass, but it is simpler and more convenient to mould them from a thermoplastic material.

FIG. 9 shows a cross-section through a single cats eye element 55 having a stepped cylindrical configuration, with a face 56 having a radius of curvature, and an elliptical front face 57. The center line of the rear face 56 is shown by broken lines 58, while the center line of the front face 57 is shown by broken lines 59. It will be noted that the center line of the rear face, is slightly above that of the front face, and thus the cylinder has a step 60 corresponding to the difference in height between the two center lines. It is preferred that the reflector is adjusted in the mould, by forming the mould in two parts, with a substantially vertical split line, so that displacement of the two mould halves will cause the step 60 to be formed, such that the rear face has a center slightly above that of the front face. In a conventional cats eye reflector, the center line of both the front and back faces are the same, so that a light ray entering the front face, will be directed towards the center of the back face, and thus will exit the front face in a line parallel to that of the original incident ray.

However, by adjusting the distance between the center line of the front and back faces, the incident ray 62 striking the front face will be directed towards a point on the rear face in line with the center line 59, but as will be apparent from FIG. 9, this is below the center line of the rear face, and thus the reflected ray will be reflected towards a different point on the front face 57, and thus the return ray 64 leaving the front face 57 will be directed at a slight angle upwardly with respect to the path of the incident ray 62. The deflection of the return ray 64 is somewhat exaggerated in this drawing, but in practice the displacement between the two mould halves will be such that the return ray will be reflected by the "cats eye" at the chosen return angle.

FIG. 10a shows a composite "cats eye" reflector in the form of a strip 66 having a plurality of individual "cats eyes" 55 of the type shown in FIG. 9. As can be seen from FIG. 10b, the slight disparity between the center lines of the front and rear faces of each cats eye creates in effect a slight step in the moulding.

The radiused rear face of the cats eye reflector is metallized, or otherwise coated with an appropriate reflecting surface, so that any light passing through the cats eye from the front face is appropriately reflected by the mirror created at the radiused rear face.

FIG. 11 shows how such a simple strip of cats eye reflectors can be mounted within a pavement marker 69, such a pavement marker typically being formed of a hard but resilient plastic or rubber material such that it can be securely mounted to a road surface, and yet if a vehicle travels over the pavement marker, it will not damage the recessed cats eye reflector 66, which is protected by the ramp surfaces 70 on either side of the reflector. Although not shown, it will be appreciated that a similar reflector can be mounted on the other side of the pavement marker. The pavement marker can be of any desired shape or size, that of FIG. 11 being only one possible form of housing for the retro-reflector system of this invention.

ADVANTAGES

When incorporated into highway lane markers, it can be seen that the reflector/lens system of the present invention could provide a significant improvement in apparent brightness of the lane markers due to reduction and/or elimination of the "waste" reflection which is diffused downwards towards the road surface and thus away from the intended observer by a non-directed reflector. An improvement in brightness of lane markers could benefit drivers and improve safety factors in bad driving conditions, and where dirt contamination has reduced the transmission of light of the lane marker. The reflector/lens system of the present invention is also advantageous in that it can be adapted to a range of intended source/observer combinations, and to various road gradients and configurations, or other locations.

The "roof edge" reflectors of FIGS. 6, 7, 8a and 8b have better optical qualities in practice than other types of reflector designs when moulded from plastic materials, as the design of these "roof edge" reflectors averages out errors on the surface of the mouldings.

The curved "roof edge" reflectors of FIGS. 6 and 8a give a tighter and more controlled vertical spread of light and are better suited to highway lane markers than the straight "roof edge" reflectors or FIGS. 7 and 8b. The latter give greater vertical dispersion and may be more useful in security applications (e.g. as in FIGS. 1 and 2).

VARIATIONS

Other applications can be envisaged for this invention. For example, where reflected light beam systems are used in security applications, the reflector/lens system of the present invention could enable the light source and the receiver to be displaced from one another, while still allowing accurate reception of the reflected beam at a predetermined position and angle. Thus more complete security coverage use a reflected light beam system can be achieved with a reduced number of light sources and receivers.

It will be appreciated that a variety of changes and modifications could be made in the above examples within the general scope of the present invention, as characterized by the following claims:

We claim:

1. A retro-reflector system including a first reflective surface arranged to receive incident light from a source; a second reflective surface arranged to receive light reflected from said first reflective surface; and a lens arranged in crossed configuration with at least said second reflective surface, so that, in use, said incident light passes through said lens and is reflected from said first reflective surface to said second reflective surface, and is reflected from said second reflective surface so as to pass through said lens and is reflected generally back towards its source, and wherein said first and second reflective surfaces intersect at a curved edge.

2. A retro-reflector system including reflecting means arranged to, in normal use, reflect light received from a source generally back towards the source but at a substantially constant angle of displacement from said source, wherein the reflecting means includes a plurality of substantially cylindrical optical elements, each having a reflecting surface at one end and a lens at the other end, the lens and reflecting surface being optically linked so as to return light from the reflecting means at a different angle to that of a light ray entering said lens of each of said optical elements.

3. A retro-reflector system as claimed in claim 2, wherein said reflecting surface has a part-spherical surface having a first center line, and said lens has a part-ellipsoidal surface having a second center line.

4. A retro-reflector system as claimed in claim 2, wherein said first center line is offset from said second center line in the direction in which the return light is angularly displaced.

5. A retro-reflector including:
a reflector arrangement including a first reflective surface arranged to receive light incident from a source and a second reflective surface arranged to receive light reflected from said first reflective surface, said reflector arrangement having an optical reflector axis;
and a lens arranged in crossed configuration with said reflector arrangement, said lens having an optical lens axis; wherein said reflector axis is significantly displaced out of alignment with said lens axis;
so that, in use, incident light passes through said lens and is reflected from said first reflective surface to said second reflective surface, and is reflected from said second reflective surface so as to pass through said lens, and is returned generally back towards its source, at a constant angle of displacement.

6. A retro-reflector as claimed in claim 5, wherein said reflector arrangement is tilted relative to said lens, whereby said reflector axis is displaced angularly out of alignment with said lens axis, said first and second reflective surfaces being substantially planar.

7. A retro-reflector as claimed in claim 5, wherein said reflector arrangement is shifted orthogonally relative to said lens axis, whereby said reflector axis is displaced transversely out of alignment with said lens axis, said first and second reflective surfaces being curved.

8. A retro-reflector system as claimed in claim 5, wherein said lens has a focal length substantially equal to the distance along said lens axis between an outer surface of said lens and a reflective surface of said reflector arrangement.

9. A retro-reflector system as claimed in claim 5, wherein said reflector axis is displaced vertically out of alignment with said lens axis, so that, in use, said incident light is returned generally back towards its source at a constant angle of vertical displacement.

10. A retro-reflector as claimed in claim 5, wherein said reflector arrangement includes a third reflective surface, said first, second and third reflective surfaces being arranged so that light incident upon any one of said surfaces from a source is reflected onto other surfaces in turn, wherein said first and second reflective surfaces are mutually orthogonal, and said third reflective surface is arranged so as to form angles significantly differing from 90° with respect to each of said first and second reflective surfaces.

11. A retro-reflector as claimed in claim 5, wherein said first and second reflective surfaces are each part cylindrical, and adjoin substantially orthogonally along a curved edge.

12. A retro-reflector as claimed in claim 5, wherein said lens is part-elliptical.

13. A retro-reflector as claimed in claim 5 wherein said reflector axis is significantly transversely displaced out of alignment with said lens axis; so that, in use, incident light passes through said lens and is reflected from said second reflective surface so as to pass through said lens and is returned generally back towards said source, at said constant angle of displacement.

14. A retro-reflector as claimed in claim 13, wherein each said reflective surface is part-spherical, and said lens is part-elliptical.

15. A retro-reflector including:
a reflector arrangement arranged to receive light incident from a source and reflect it, said reflector arrangement having an optical reflector axis;
and a lens arranged in crossed configuration with said reflector arrangement, said lens having an optical lens axis; wherein said reflector axis is significantly displaced out of alignment with said lens axis;
so that, in use, incident light passes through said lens, and is reflected from said reflector arrangement so as to pass back through said lens, and is returned generally back towards its source, at a constant angle of displacement.

16. A retro-reflector as claimed in claim 15, wherein said reflector arrangement includes a first reflective surface arranged to receive light incident from a source and a second reflective surface arranged to receive light reflected from said first reflective surface, and wherein said reflector arrangement is tilted relative to said lens, whereby said reflector axis is displaced angularly out of alignment with said lens axis, said first and second reflective surfaces being substantially planar.

17. A retro-reflector as claimed in claim 15, wherein said reflector arrangement includes a first reflective surface arranged to receive light incident from a source and a second reflective surface arranged to receive light reflected from said first reflective surface, and wherein said reflector arrangement is shifted orthogonally relative to said lens axis, whereby said reflector axis is displaced transversely out of alignment with said lens axis, said first and second reflective surfaces being curved.

18. A retro-reflector system as claimed in claim 15, wherein said lens has a focal length substantially equal to the distance along said lens axis between an outer surface of said lens and a reflective surface of said reflector arrangement.

19. A retro-reflector system, including a first reflective surface arranged to receive incident light from a source; a second reflective surface arranged to receive light reflected from said first reflective surface; and a first lens arranged in crossed configuration with at least said second reflective surface, so that, in use, said incident light is reflected from said first reflective surface to said second reflective surface, and from said second reflective surface through said first lens to a region displaced from said source by a substantially predetermined amount in a substantially predetermined direction, and said light is diffused by said first lens to a substantially predetermined extent.

20. A retro-reflector system as claimed in claim 19, wherein said first lens is a part-elliptical lens element.

* * * * *